US005447477A

United States Patent [19]

Bresson et al.

[11] Patent Number: 5,447,477

[45] Date of Patent: Sep. 5, 1995

[54] ELECTRIC GEAR MOTOR WITH EPICYCLOIDAL REDUCTION AND AUTOMATIC BRAKE FOR SUPPLE SHUTTERS OF THE BALANCED TYPE

[75] Inventors: René Bresson, Mantoche; Christophe Bresson, Cugney, both of France

[73] Assignee: Simu, Arc Les Gray, France

[21] Appl. No.: 144,529

[22] Filed: Nov. 2, 1993

[30] Foreign Application Priority Data

Nov. 12, 1992 [FR] France ................................ 92 13810

[51] Int. Cl.$^{6}$ ................................................ F16H 3/64

[52] U.S. Cl. ......................................... 475/154; 475/4; 475/269; 160/310

[58] Field of Search ........................ 475/3, 4, 154, 157, 475/900, 269; 160/133, 310, 311

[56] References Cited

U.S. PATENT DOCUMENTS 2,670,065 2/1954 Stevens, Jr. ......................... 160/133
3,921,264 11/1975 Madonian et al. .................. 475/154
5,203,392 4/1993 Shea .................................. 160/133

FOREIGN PATENT DOCUMENTS 517905 10/1955 Canada ............................... 475/154

*Primary Examiner*—Charles A. Marmor
*Assistant Examiner*—Sherry Lynn Estremsky
*Attorney, Agent, or Firm*—Dowell & Dowell

[57] ABSTRACT

An electric gear motor with reduction gears and automatic brake for shutters, wherein an emergency control is provided to allow the shutter to be manually maneuvered in the event of motor brake down or loss of power. A toothed ring is normally retained in a non-rotatable position relative to the reduction gears under the influence of a yieldable leg of a spring pin. The yieldable leg is movable away from the ring to permit the ring to rotate with the reduction gears and free of a motor drive shaft in the event the motor fails to activate in a normal manner thus enabling the shutters to be manually operated.

5 Claims, 3 Drawing Sheets

— PRIOR ART —

ELECTRIC GEAR MOTOR WITH EPICYCLOIDAL REDUCTION AND AUTOMATIC BRAKE FOR SUPPLE SHUTTERS OF THE BALANCED TYPE

BACKGROUND OF THE INVENTION

The present invention relates to an electric gear motor with epicycloidal reduction and automatic brake for the automation of supple wind-up shutters of the balanced type.

FIELD OF THE INVENTION

For protecting certain premises, and more particularly shop windows and entrances, shutter devices are frequently employed in which the flexible shutter (grating or articulated slats) adapted to be wound or unwound, is associated with elastic balancing means which are stretched when the shutter is lowered (closure) in order to assist the reverse operation of raising (opening).

The general arrangement of such a device may be seen in FIG. 1 of the accompanying drawings. The flexible shutter 1, of Which the edges cooperate with vertical guides 2 fixed on either side of the opening to be protected, is secured by its upper edge with two drums 3 mounted idly on a horizontal beam 4 supported by two lateral plates 5. Inside each drum 3 is a spiral spring of which one end is fixed to the beam 4, while the opposite end is fastened to the inner wall of the corresponding drum. It will be understood that each spring is wound during descent of the shutter 1 and that it thus tends to drive its drum 3 in the opposite direction when raising the shutter.

Although such a system allows the shutter to be operated by hand, it has been proposed to power it by fixing a gear motor 6 on the beam 4, between the two drums 3. The gear motor comprises an end-of-stroke mechanism **6*a* intended for controlling an electric motor associated with an automatic brake and a speed reducer, most often of the epicycloidal type. The driven shaft of this gear motor drives a pinion gear which cooperates with teeth made inside a drum 6*b*, with the result that it suffices to fix the upper edge of the shutter 1 to the drum to operate it electrically with the aid of a changeover switch of the type indicated at 7**.

An emergency control should, of course, be provided, intended to compensate for a breakdown of the drive motor or a power failure, by allowing the shutter to be manually operated despite the presence of the automatic brake. This emergency control is usually operated with a handle 8 connected by a cable 9 to a fork arranged to act on the movable part of the brake and to move it away from the fixed part against elastic means which tend to maintain the parts applied against one another.

The force to be exerted on control 8 is considerable and, furthermore, manual operation of the shutter 1 is rendered difficult as the ring **6*b*** remains connected to the assembly of the epicycloidal reduction mechanism which must therefore be driven in rotation for displacement of the shutter.

It is an object of the invention to overcome this drawback.

SUMMARY OF THE INVENTION

To that end, the present invention essentially consists in causing the emergency control to act, no longer on the automatic brake, but on the toothed ring of the epicycloidal reducer in order to release it and thus momentarily stop the transmission of the movement to the automatic brake connected to the electric drive motor.

BRIEF DESCRIPTION OF THE DRAWINGS

The invention will be more readily understood on reading the following description with reference to the accompanying drawings, in which.

DESCRIPTION OF THE PREFERRED EMBODIMENT

Figure 2:
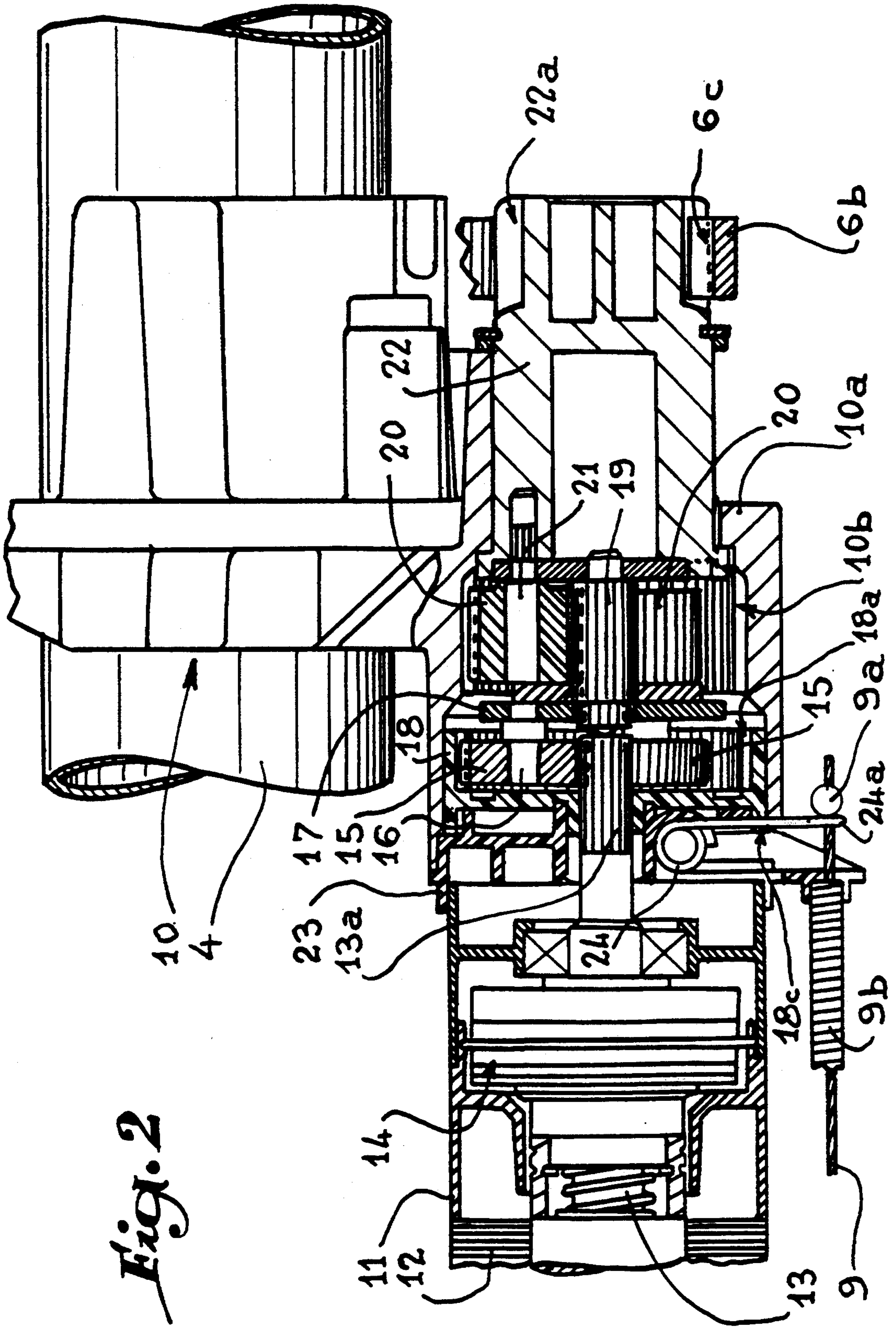
FIG. 2 is a partial axial section showing on a larger scale the arrangement of the gear motor according to the invention.

Referring again to the drawings, FIG. 2 shows a beam 4 on which is secured a frame 10 forming support for a gear motor assembly. The latter comprises a cylindrical envelope 11 which contains the electric drive motor 12 whose shaft 13 is connected, through an electromagnetic brake 14, to a reducer system of the epicycloidal type shown in detail in FIG. 3.

This system comprises a first speed reducing gear train comprising a planet gear **13*a* directly provided at the end of the shaft 13 of the motor 12. This planet gear 13*a* meshes with satellite gears 15 mounted idly on pins 16 carried by a plate 17. These gears 15 themselves mesh with the inner teeth 18*a* of a ring 18** of which the particular assembly will be described hereinafter.

Figure 1:
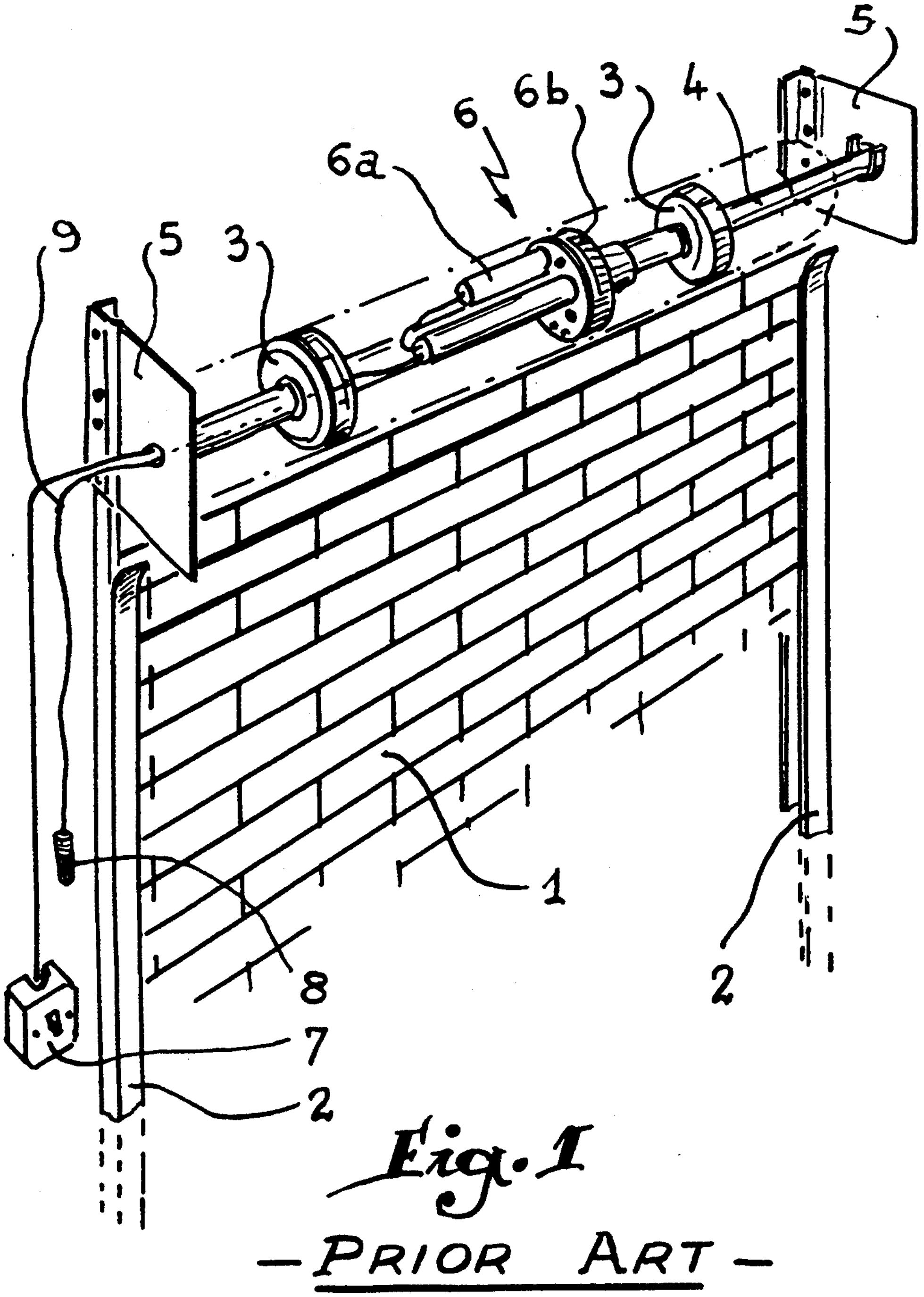
FIG. 1 is a view in perspective schematically indicating the implantation of an electric gear motor of the type according to the present invention.

The plate 17 is fitted at the end of the planet gear 19 of a second speed reducing gear train which may be seen in FIG. 2. This second train comprises satellite gears 20 which cooperate simultaneously with the planet gear 19 and with a fixed toothing **10*b* which is assumed to have been directly cut inside the tubular boss 10*a* of the frame 10 which supports the envelope 11. The pins 21 which support the satellites 20 are carried by a terminal part 22 which projects in front of a boss 10*a* and whose free end is shaped in the manner of a pinion gear 22*a*, which meshes with teeth 6*c* made inside the drum 6*b* of FIG. 1**.

Figure 3:
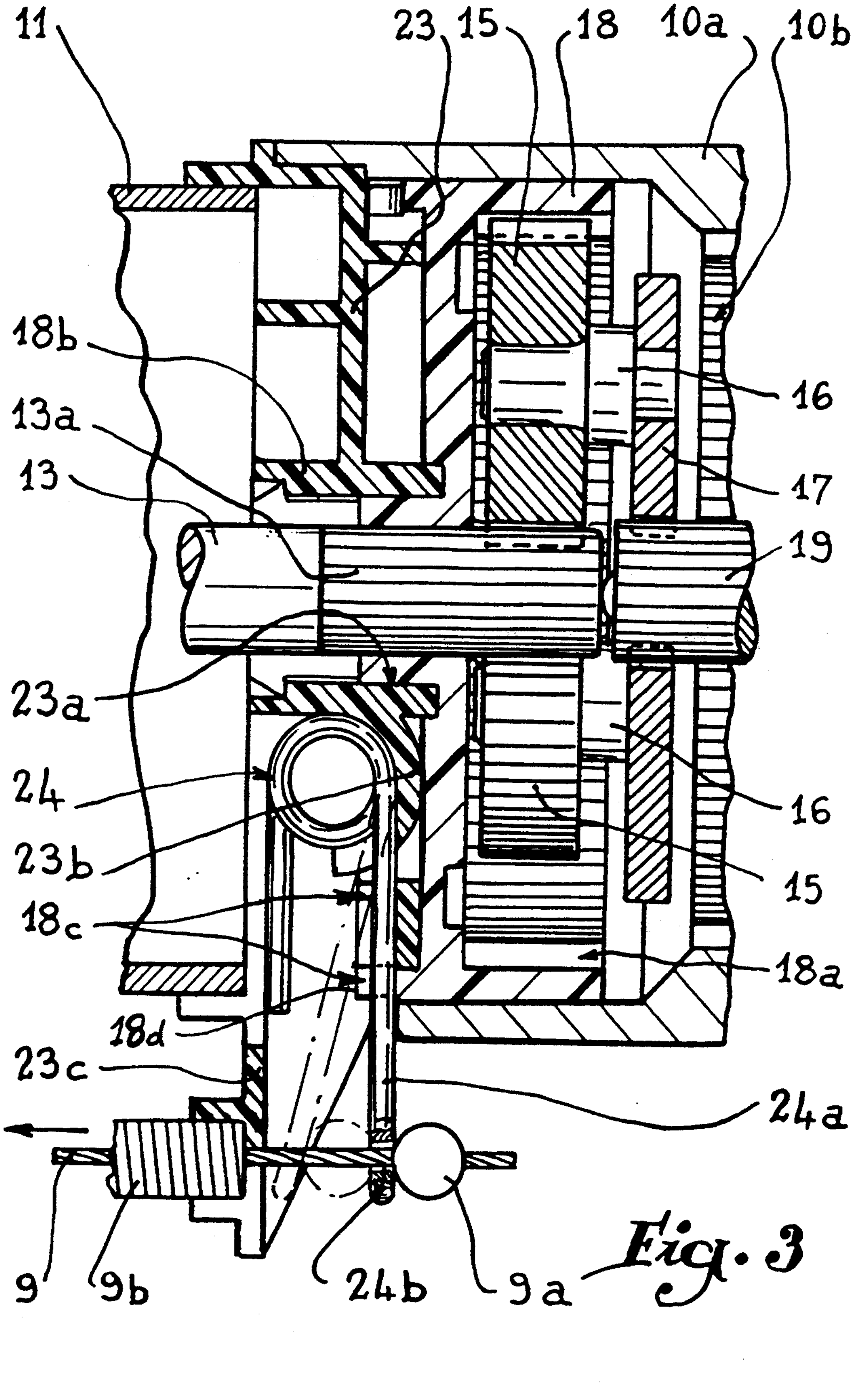
FIG. 3 shows, on a still larger scale, the emergency control of the gear motor of FIG. 2.

Referring to FIG. 3, it should be observed that the ring 18 whose teeth **18*a* cooperate with the satellites 15 of the first speed reducing gear train is mounted in the tubular boss 10*a* so as to be able to rotate about the common axis of the ring and the boss. To that end, it comprises a central hub 18*b* mounted idly inside the opening 23*a* of a ring 23 inserted axially between the opposite ends of the envelope 11 and of the boss 10*a*** which ensures retention of the ring.

Retention of the ring 18 is effected with the aid of a retractable or elastically deformable member which, in the embodiment shown, is constituted by a wound spring pin 24 whose loop is housed in a cradle **23*b* of the fixed ring 23. One, referenced 24*a*, of the two legs or extensions of this pin 24 is provided to be sufficiently long to project from the outer profile of the boss 10*a* and to present a terminal eyelet 24*b* traversed by the end of the cable 9, which is provided with a stop 9*a*. The sheath 9*b* which surrounds this cable 9 bears against a lateral tab 23*c* of the ring 23**.

The elastic reaction of the pin 24 tends to maintain side **24*a* engaged in one of a series of notches 18*c* made in an annular edge 18***d* provided on the transverse face of the ring 18 which faces towards the ring 23.

Under these conditions, ring 18 cannot rotate on itself, with the result that it performs its function with respect to the satellite gears 15 of the first speed reducing gear train, the gears thus being obliged, due to the rotation of the shaft 13 and of the planet gear 13*a*, to rotate on themselves, imparting to the plate 17 a slow movement of rotation. The second speed reducing gear train 19–20 further reduces the speed of rotation, so that the gear 22*a* correctly drives the drum 6*b* and ensures the desired actuation of the shutter 1.

On the contrary, in the event of breakdown of the motor 12 or of power failure, it suffices for the user to operate the handle 8 by pulling. The cable 9 then causes the leg 24*a* of the pin 24 to be deformed in the manner illustrated in broken lines in FIG. 3, so that the leg is extracted from the notch 18*c* in which it was seated. Consequently, ring 18 is unlocked and is therefore free to rotate on itself.

It is therefore readily appreciated that the drum 6*b* is then dissociated from the shaft 13 which remains elastically held by the brake 14, so that the user may manouver the shutter 1 manually, for raising or lowering it. In fact, due to its rotational freedom, the toothed ring 18 may be driven in rotation by the satellites 15 which then roll on the planet gear 13*a* without driving the latter.

As soon as the user actuates the control handle 8 in an opposite direction, i.e. releasing cable 9, leg 24*a* of pin 24 resumes, by elasticity, its initial orientation for which it ensures, by engagement in one of the notches 18*c*, the connection of the ring 18 and the fixed ring 23. The gear motor is thus able to operate again.

It will be readily appreciated that manual operation of the closure allowed by the emergency control according to the invention is considerably facilitated with respect to conventional solutions as such operation is effected without the reducing system being driven.

It goes without saying that other embodiments may be envisaged for the elastically deformable or otherwise retractable member which ensures retention of the toothed ring.

It must, moreover, be understood that the foregoing description has been given only by way of example and that it in no way limits the domain of the invention which would not be exceeded by replacing the details of execution described by any other equivalents.

What is claimed is:

1. An electric gear motor for operating a wind-up drum for a shutter wherein the motor includes a drive shaft assembly which includes a brake mechanism which is drivingly connected to a reduction gear mounted within a frame which reduction gear is drivingly connected to the wind-up drum, the reduction gear including satellite gears which are driven by the drive shaft assembly so as to rotate in meshing relationship to a normally non-rotating ring having inner toothing, the improvement comprising, an emergency control for permitting the ring to rotate with the satellite gears of the reduction gear to thereby permit the reduction gear to rotate about the drive shaft assembly, said control including a pin member having a pair of elastically movable legs, means for mounting said pin member in said frame and adjacent said ring, one of said legs being normally seated within a notch provided in a portion of the ring to thereby prevent the ring from rotating with the satellite gears, means attached to said one of said legs for urging said one of said legs from said notch to thereby permit the ring to rotate with the satellite gears whereby the shutters may be operated when the motor drive shaft assembly is not operable.

2. The electric gear motor of claim 1 wherein said one of said legs of said pin member includes an eyelet, said means attached to said one of said legs including a cable extending through said eyelet and a stop means secured to said cable to prevent withdrawal of said cable from said eyelet.

3. The electric gear motor of claim 2 including a sheath means surrounding said cable, said sheath means being spaced from said eyelet of said pin member.

4. The electric gear motor of claim 2 including a fixed ring member mounted about said drive shaft assembly and adjacent to the ring, said fixed ring member including a cradle portion for supporting said pin member.

5. The electric gear motor of claim 1 including a fixed ring member mounted about said drive shaft assembly and adjacent to the ring, said fixed ring member including a cradle portion for supporting said pin member.

* * * * *